United States Patent [19]

Finch

[11] 4,339,998

[45] Jul. 20, 1982

[54] FUEL LEVEL INDICATOR

[76] Inventor: James Finch, Roxbury, N.Y. 12474

[21] Appl. No.: 143,762

[22] Filed: Apr. 25, 1980

[51] Int. Cl.³ .............................................. F23N 5/18
[52] U.S. Cl. .................................. 110/186; 110/117;
110/248; 110/255; 110/259; 110/101 CC
[58] Field of Search ............... 110/185, 186, 248, 255,
110/259, 267, 276, 328, 101 R, 101 C, 101 CR,
101 CC, 101 CD, 116, 117, 169

[56] References Cited

U.S. PATENT DOCUMENTS

| 742,198 | 10/1903 | Jasten | 110/101 CC |
|---|---|---|---|
| 1,335,265 | 3/1920 | Zamernik | 110/117 |
| 1,769,880 | 7/1930 | Howle | 110/248 |
| 2,058,945 | 10/1936 | Barnett | 110/186 |
| 2,333,426 | 11/1943 | Jolly . | |
| 2,400,141 | 5/1946 | Shaffer . | |
| 2,524,868 | 10/1950 | Worsham | 110/117 |
| 3,159,290 | 12/1964 | Hesse . | |
| 3,332,673 | 7/1967 | McKie . | |
| 3,785,304 | 1/1974 | Stookey | 110/255 |
| 3,888,231 | 6/1975 | Galluzzo . | |
| 3,921,545 | 11/1975 | Ruegsegger | 110/186 |
| 4,201,141 | 5/1980 | Teodorescu et al. | 110/259 |

Primary Examiner—Henry C. Yuen
Attorney, Agent, or Firm—John Maier, III

[57] ABSTRACT

The present invention relates to a fuel level indicator for a heating unit, such as a stove or furnace. In particular, the invention relates to an indicator for a wood burning heating unit with a grate which is slightly elevated when there is insufficient wood causing an electrical signal which may be used with a light or buzzer to indicate the need for fuel or with a conveyor automatically to feed fuel into the heating unit.

2 Claims, 5 Drawing Figures

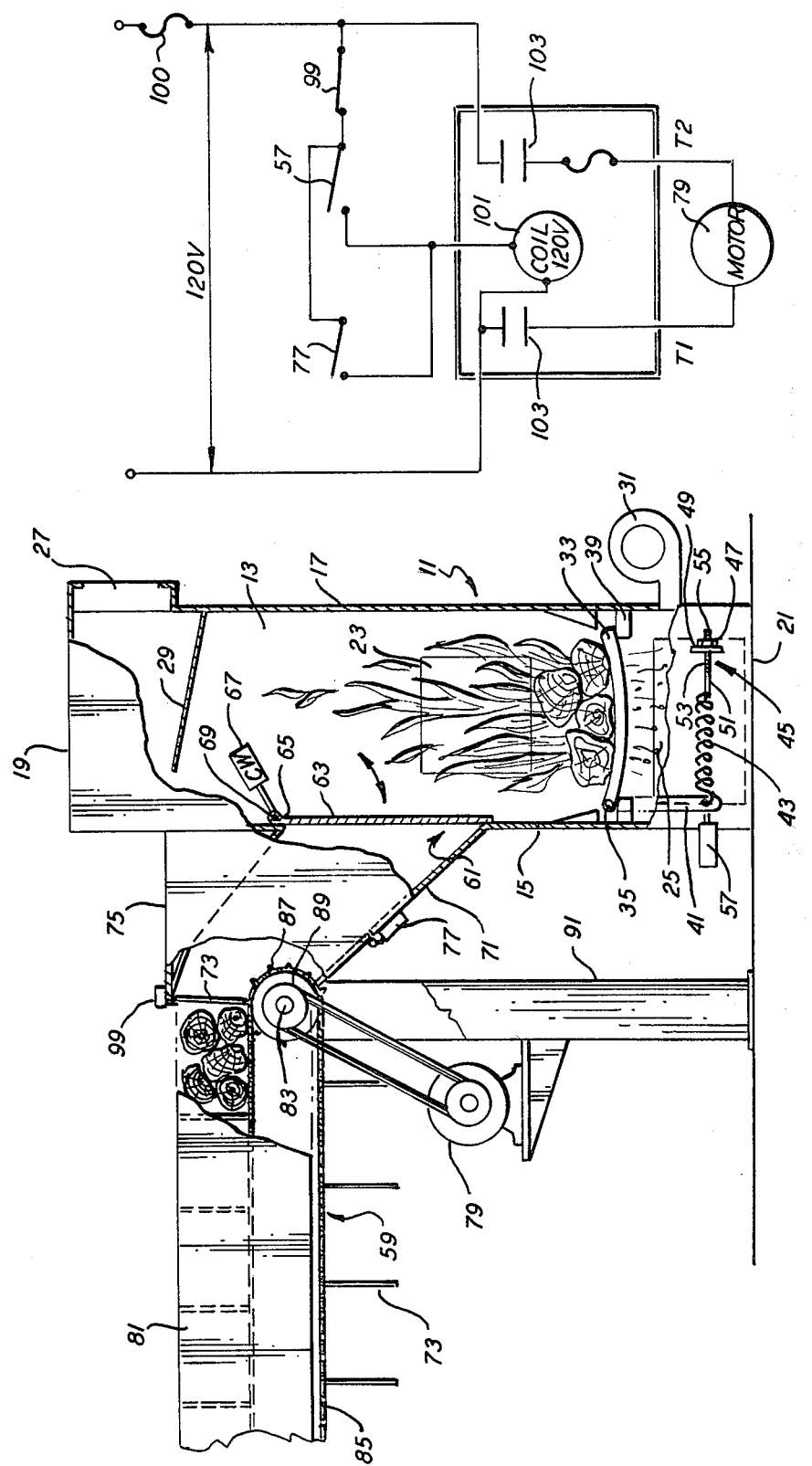

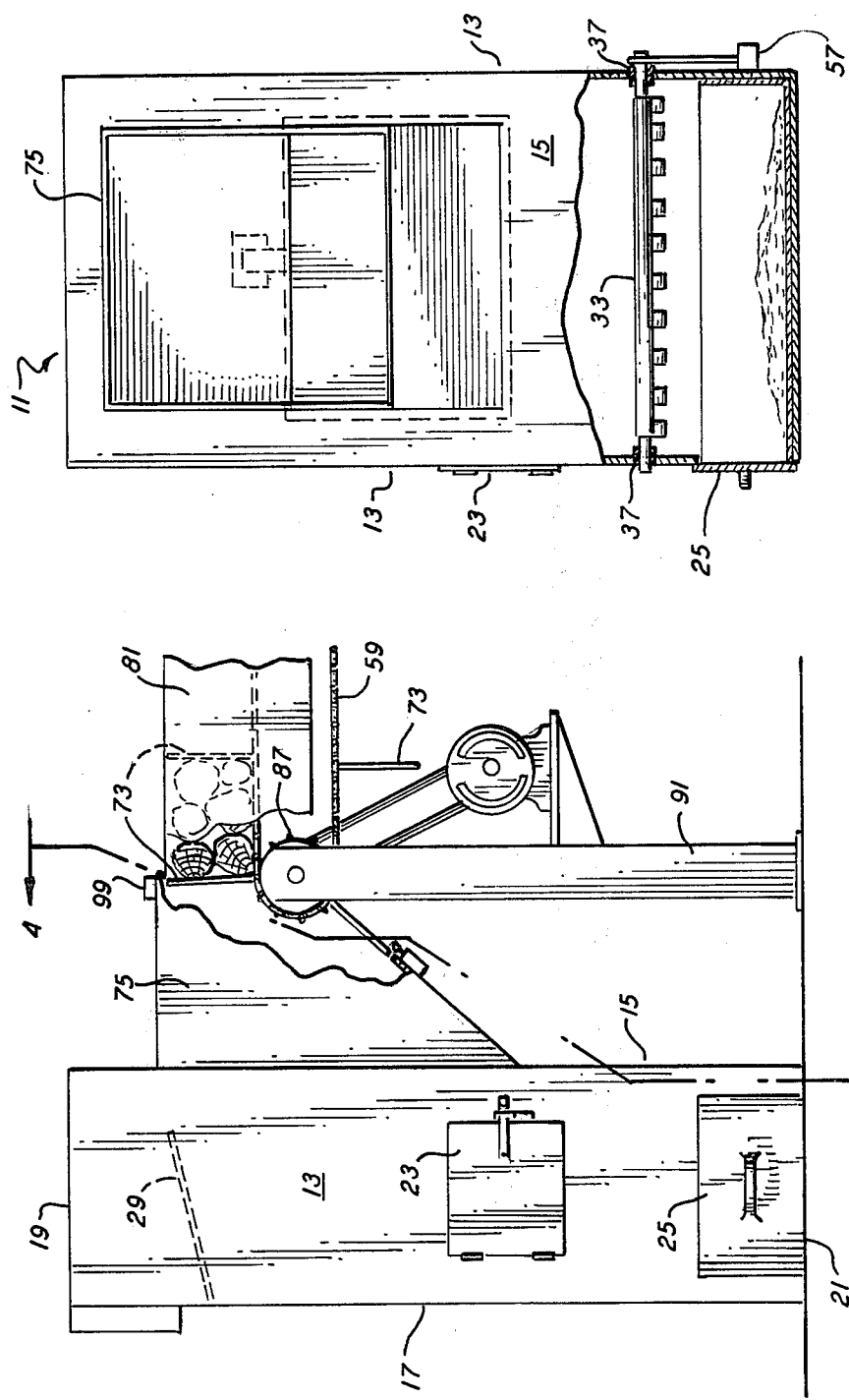

FUEL LEVEL INDICATOR

BACKGROUND OF THE INVENTION

A. Field of the Invention

The invention relates to heating units such as stoves and furnaces particularly of the wood burning type wherein the need for fuel is signaled as a result of the load of the fuel in the grate. Specifically, the signal which is electrical may be either a buzzer or light or may actuate a conveyor automatically to feed fuel into the heating unit.

B. Description of the Prior Art

In the past, particularly several or more decades ago, it was common practice to fuel heating units with coal and coke at which time stokers of various types were known in the art. Such stokers frequently used conveyors to feed fuel to the heating unit. However, such stokers determined the need for fuel by sensing the upper level of the fuel.

SUMMARY OF THE INVENTION

The invention provides a heating unit such as a stove or furnace which automatically detects the need for further fuel particularly wood. The invention makes possible the use of wood or other solid fuels for heating without the undesirable problem of the fire either going out or being reduced to a very low level without detection.

The stove or furnace uses a grate preferable concave in shape, which is pivotably mounted at the lower level of the stove or furnace in the area traditionally utilized by the grate. The grate is mounted on a pivotable axle secured to one side of the grate. The axle is rotatably mounted in the furnace or stove. A stop, secured to the stove or furnace located on the other side of the grate from the axle prevents the grate from swinging downwardly from a generally horizontal position. One end of the pivotable axle on which the grate is mounted extends outside of the firebox of the stove or furnace. An arm extends from the pivotable axle. A spring is connected to the outside end of the arm causing the axle to rotate upwardly off the stop. A start electrical switch is located so that when the grate is all the way against the stop, the switch is opened by the arm. The start electrical switch is closed when the grate is up and the arm does not depress the switch. Thus, when the grate is up, an electrical signal is provided. The electrical signal may be utilized to provide a visual or audible indication of the need to refuel the heating unit manually. Preferably the electrical signal, either separately or in addition to the audible or visible indication, also starts a conveyor which feeds fuel into the heating unit. When a conveyor is used, a door which is pivotably mounted at its top is used to drop fuel down a chute into the firebox. A counterweight is used to keep the door in a normally closed position. The conveyor is sectionalized by dividers one of which will strike a stop electrical switch when one section of fuel is deposited into the stove thereby causing the conveyor to stop. The weight of the fuel on the grate will press downwardly against the stop causing the start electrical switch to open.

Accordingly, it is an object of the invention to provide a means for a heating unit, such as stove or furnace, preferably for burning wood, which will indicate the need for fuel.

Another object of the invention is to provide a means for a heating unit, preferably for the burning of wood, where fuel will be automatically fed into the firebox as required.

A further object of the invention is to provide a means whereby a heating unit can burn continuously for a long period of time without supervision.

Another object of the invention is to provide a means for a heating unit which will automatically provide a visible or audible indication of the need for more fuel.

The novel features which are considered as characteristic of the invention are set forth with particularity in the appended claims.

The invention itself, however, as to its construction and obvious advantages will be best understood from the following description of the specific embodiment when read with the accompanying drawings.

DESCRIPTION OF THE DRAWINGS

FIG. 1 is a side view of a heating unit and a conveyor with a portion of the heating unit and conveyor broken away showing the fuel level indicator, in accordance with this invention.

FIG. 2 is a schematic diagram of the electrical circuit utilized in accordance with the invention.

FIG. 3 is a side view of the heating unit and conveyor opposite from the side shown in FIG. 1 again with portions broken away.

FIG. 4 is a front view, partially in cross section taken along line 4—4 of FIG. 3.

DETAILED DESCRIPTION OF THE PREFERRED EMBODIMENTS OF THE INVENTION

Figure 5:
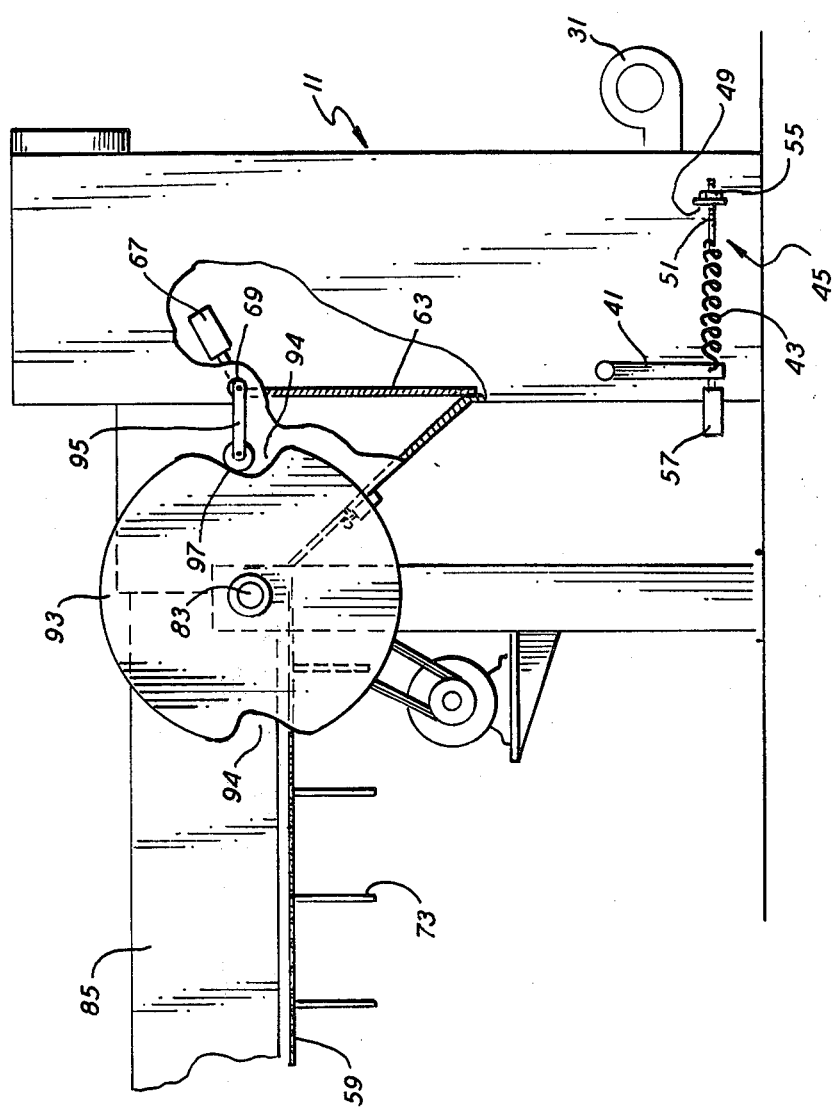
FIG. 5 is a side view similar to FIG. 1 but showing a modification of the same invention.

Although the description hereof is detailed and exact to enable those skilled in the art to practice the invention, the physical embodiments herein disclosed merely exemplify the invention which may be embodied in other specific structures. The scope of the invention is defined in the claims appended hereto.

FIG. 1 shows a heating unit 11 in the form of a wood burning stove. It should be understood that heating coils for hot water could be placed within the interior of the stove or a jacket placed about it to create either a hot water furnace or hot air furnace. Therefore, the term "heating unit" should be considered to include either a furnace or a stove or other device of the same category without limitation.

The heating unit 11 shown has a rectangular configuration but other configurations are possible which utilize the invention. The heating unit has two side walls 13, a front wall 15, a back wall 17, a top 19 and a base 21. A door 23 for inspection of the fire and for the supplying of fuel manually is located on one side. A lower door 25 is also located on the side of the heating unit 11 near its very base 21 for the removal of ash. At the top 19 of the heating unit 11, as is commonplace, a flue opening 27 is provided to connect the heating unit 11 to an appropriate flue (not shown).

Although not essential to this invention, a baffle 29 is frequently located in the heating unit 11 so as to elongate the length of flow of the products of combustion for greater heat extraction. Also, a blower 31 may be provided below the level of the grate to supply a forced draft for combustion. However, this invention is equally applicable with a natural draft.

As best seen in FIGS. 1 and 4, a grate 33 is pivotably mounted along one edge of an axle 35. One end of the axle 35 extends outside of the heating unit 11. Both ends of the axle 35 are rotatably supported in journals 37 secured in the side walls 13 of the heating unit 11. The axle 35 is located along one side of the grate 33 which is preferably curved to a slight degree to form a concave upper surface extending downwardly from the axle 35 and then back upwardly to the side of the grate 33 opposite from the axle. At the side of the grate 33 opposite from the axle 35, a stop 39 is rigidly mounted on the back wall 17 of the heating unit 11. The stop 39 extends from the back wall 17 of the heating unit 11 so that the edge of the grate 33 will rest on the stop 39 in a horizontal position. When the heating unit 11 is loaded with fuel, as for example wood, the grate 33 will be forced downwardly onto the stop 39 by the weight of the wood. Outside the heating unit, an arm 41 extends substantially at right angles from the axle 35. Preferably, the arm 41 extends downwardly in a generally vertical position. The arm 41 is rigidly affixed to the axle 35 so that when the axle 35 rotates, as for example when the grate moves upwardly off the stop, the arm 41 would rotate slightly to an acute angle from the vertical or whatever position the arm 41 held when the grate 33 was against the stop 39. A spring 43 is connected at one end to the outside end of the arm 41 and the opposite end of the spring 43 is connected to an adjustable tensioning device 45 which is affixed to the outside surface of the side 13 of the heating unit 11. The adjustable tensioning device 45 has a mounting plate 47 secured to the outside surface of the side 13 of the heating unit 11. A hole 49 is located in the mounting plate 47 at substantially right angles to the general direction of the arm 41. For example, with the arm 41 in a vertical position, the opening or hole 49 in the mounting plate 47 would be generally horizontal. A rod 51 is slidably fitted into the opening 49 in the mounting plate 47. One end of the rod 51 has a thread 53 and a tension nut 55 is mounted on that thread 53. The other end of the rod 51 is connected to one end of the spring 43 opposite from the end of the spring 43 connected to the arm 41. The tensioning nut 55 is adjustable and when tightened, the tensioning device 45 increases the tension in the spring 43. The force of the spring 43 causes the arm 41 to pivot which necessitates rotation of the axle 35 and movement of the grate 33 off the stop 39. At the outside end of the arm 41 but on the opposite side of the arm from where the spring 43 is connected, an electrical start switch 57 is located. When the grate 33 is down against the stop 39, a button on the electrical start switch 57 is pressed into the switch 57 causing the electrical start switch 57 to open. However, when the grate 33 is rotated off the stop 39 due to the force of the spring 43, when there is only a very limited amount of fuel still remaining on the grate, the arm 41 releases the button and the electrical switch 57 closes. When the electrical start switch 57 is closed, a simple electrical circuit may be made thus actuating a light or a buzzer (not shown) to signal that fuel is required for the heating unit 11.

However, rather than just to signal the requirement for fuel, a conveyor belt 59 may be used automatically to place the fuel into the heating unit 11. When the conveyor belt 59 is used, a feed opening 61 is provided in the front wall 15 of the heating unit 11 and a self-opening and closing door 63 is mounted on the front wall 15 of the heating unit 11. The self-opening and closing door 63 is pivotably mounted at its upper edge 65 on the front wall 15 of the heating unit 11. A counterweight 67 is used to force the door 63 closed. The counterweight 67 is mounted on an inner arm 69 extending from the upper edge 65 of the self-opening and closing door 63 so that the weight of the counterweight 67 rotates the door 63 to a normally closed position. A chute 71 is provided to guide fuel into the heating unit 11. The weight of the fuel, usually wood, sliding down the chute 71 forces the fuel through the self-opening and closing door 63 forcing the door 63 to pivot open against the force of the counterweight 67. The chute 71 is a panel extending outwardly from the lower edge of the self-opening and closing door 63 at an acute angle to the door 63 when closed. The conveyor belt 59 is mounted preferably in a horizontal position. The conveyor bolt 59 is separated into sections by dividers 73 which extend outwardly substantially at right angles from the conveyor belt 59. A hood 75 is located over the self-opening and closing door 63 and the size of the dividers 73 is limited so that they will readily fit under the hood 75 and will extend downwardly to miss the chute 71 while extending out to it.

At the edge of the chute 71, a stop switch 77 is mounted. The start switch 57, actuated by the arm 41, starts an electric motor 79 which drives the conveyor belt 59 causing fuel located on the section of the conveyor belt 59 adjacent the front wall 17 of the bearing unit 11, to drop the fuel in that section down the chute 71 into the heating unit 11 by forcing the door 63 open against the force of the counterweight 67 as previously explained. When this occurs, the weight of the fuel on the grate 33 will cause the arm 41 to press against the electrical start switch 57 thereby opening the start switch 57. The motor 79, however, will continue to operate and drive the conveyor belt 59 until the stop switch 77 is actuated by a divider 73 of the conveyor belt 59.

Each of the dividers 73 extends to the inner surface of the hood 75 and the end of the chute 71. In this way, once a divider passes under the hood the wood is secured in place between its two continguous dividers 73. End plates 81 prevent the wood from falling off the conveyor.

As best seen in FIGS. 1 and 5 the conveyor belt 59 rotates on spindle 83. The conveyor belt 59 is constructed from a pair of chains 85 with the dividers 73 located across the pair of chains 85. The pair of chains 85 are mounted upon drive gears 87, one of which is driven by a pulley 89 connected to the motor 79. The drive gears 87 and the motor 79 are mounted on pillars 91.

In the alternate embodiment shown in FIG. 5 a cam 93 is mounted on the end of the spindle 83 and rotates with the spindle as the conveyor moves. The cam 93 is essentially a disk with two depressions 94 in the circumference located 180 degrees apart.

An outside arm 95 extends outwardly from the inner arm 69 on which the counterweight is mounted. A roller 97 is mounted on the outside end of the outside arm 95. As the cam rotates, the cam forces the door 63 to open except when the roller 97 engages a depression. Then, the counterweight 67 forces the door 63 closed.

As seen in FIG. 2, the electrical start switch 57 and the electrical stop switch 77 are located in an electrical circuit with the motor 79 which drives the conveyor belt 59. A safety switch 99 located on the outside edge of the hood 75 may also be included in the circuit to stop the conveyor as required along with a fuse 100. A wood load too high on the conveyor belt 59 will strike the safety switch 99 stopping the motor 79 before the conveyor belt 59 is jammed. There is also a solenoid 101 in the circuit with two contacts 103. One contact, instead of two could also be used. The solenoid 101 is normally open but when energized closes and remains closed as long as the circuit is actuated. The solenoid 101 is closed when the start switch 57 is closed and the solenoid contacts remain closed until the stop switch 77 is opened, even if only opened momentarily. Once the stop switch 77 has been opened, even if it quickly closes again, a sufficient interruption has occurred to stop operation of the motor 79 and the conveyor belt 59.

The invention may be embodied in other specific forms without departing from the spirit or essential characteristics thereof. The present embodiments are, therefore, to be considered in all aspects as illustrative and not restrictive. The scope of the invention is indicated by the appended claims rather than the foregoing description and all changes which come within the meaning of range and equivalency of the claims are, therefore, intended to be embraced therein.

I claim:

1. A fuel level indicator for use in a heating unit for burning fuel, said fuel level indicator comprising:
    a grate for supporting fuel, said grate having openings therein to permit the burnt fuel to pass through them;
    an axle rotatably mounted in said heating unit and rigidly affixed to said grate along one edge of the grate, one end of said axle extending outside said heating unit;
    a stop secured to said heating unit to support the edge of the grate opposite from the edge rigidly affixed to the axle;
    an arm extending at right angles generally vertically downwardly from the end of said axle outside said heating unit;
    a mounting plate secured to the outside of said heating unit, said mounting plate having an opening therein;
    a tensioning rod with one end threaded and being slidably mounted in said opening;
    a spring generally horizontally oriented and connected at one end to the end of said arm remote from said axle and at the other end to said tensioning rod, said tensioning rod including means for increasing the tension in said spring;
    an electrical switch means mounted adjacent said arm and on the opposite side of said arm as said spring, said electrical switch means being open when said arm presses against said electrical switch means and being closed when said spring forces said arm away from said electrical switch means;
    electrical circuit means connected to said electrical switch means to provide an electrical signal when said electrical switch means is closed; and
    a conveyor means adjacent said heating unit for feeding fuel to said heating unit, said heating unit having an opening therein adjacent said conveyor means.

2. A fuel level indicator for use in a heating unit for burning fuel, said fuel level indicator comprising:
    a grate having a generally rectangular shape with a concave cross section for supporting fuel, said grate having openings therein to permit the burnt fuel to pass through them;
    an axle rotatably mounted in said heating unit and rigidly affixed to said grate along one edge of the grate;
    a stop secured to said heating unit to support the edge of the grate opposite from the edge rigidly affixed to the axle, the cross-section of the grate between said two opposite sides of the grate being concave;
    an arm extending at right angles generally vertically downwardly from the end of said axle outside said heating unit;
    a mounting plate secured to the outside of said heating unit, said mounting plate having an opening therein;
    a tensioning rod with one end threaded and being slidably mounted in said opening;
    a spring generally horizontally oriented and connected at one end to the end of said arm remote from said axle and at the other end to said tensioning rod, said tensioning rod having a nut mounted therein for increasing the tension in said spring;
    an electrical switch means mounted adjacent said arm and on the opposite side of said arm as said spring, said electrical switch means being open when said arm presses against said electrical switch means and being closed when said spring forces said arm away from said electrical switch means;
    electrical circuit means connected to said electrical switch means to provide an electrical signal when said electrical switch means is closed;
    a conveyor belt adjacent said heating unit for feeding fuel to said heating unit, said heating unit having an opening therein;
    a door pivotably mounted at its top in said opening;
    a counterweight affixed to said door to rotate said door closed;
    a chute extending from the bottom of said opening to adjacent said conveyor belt; and
    a motor for driving said conveyor belt, said motor being actuated by said electrical circuit means, said electrical circuit further including an electrical stop switch means mounted on said chute adjacent said conveyor belt to deactivate said electrical circuit means.

* * * * *